US012401416B2

(12) United States Patent
Akyildiz et al.

(10) Patent No.: US 12,401,416 B2
(45) Date of Patent: Aug. 26, 2025

(54) LOW-OVERHEAD ONLINE ROUTING SCHEME FOR ULTRA-DENSE SOFTWARE-DEFINED CUBESAT NETWORKS

(71) Applicant: Georgia Tech Research Corporation, Atlanta, GA (US)

(72) Inventors: Ian F. Akyildiz, Atlanta, GA (US); Ahan Kak, Murray Hill, NJ (US)

(73) Assignee: Georgia Tech Research Corporation, Atlanta, GA (US)

( * ) Notice: Subject to any disclaimer, the term of this patent is extended or adjusted under 35 U.S.C. 154(b) by 410 days.

(21) Appl. No.: 18/029,846

(22) PCT Filed: Oct. 14, 2021

(86) PCT No.: PCT/US2021/054957
§ 371 (c)(1),
(2) Date: Mar. 31, 2023

(87) PCT Pub. No.: WO2022/081830
PCT Pub. Date: Apr. 21, 2022

(65) Prior Publication Data
US 2023/0421252 A1    Dec. 28, 2023

Related U.S. Application Data

(60) Provisional application No. 63/091,712, filed on Oct. 14, 2020.

(51) Int. Cl.
*H04B 7/185* (2006.01)
*B64G 1/24* (2006.01)

(52) U.S. Cl.
CPC ........ *H04B 7/18584* (2013.01); *B64G 1/242* (2013.01); *H04B 7/18521* (2013.01)

(58) Field of Classification Search
None
See application file for complete search history.

(56) References Cited

U.S. PATENT DOCUMENTS

| 6,442,147 B1* | 8/2002 | Mauger | H04B 7/18589 370/395.43 |
| 2019/0041217 A1* | 2/2019 | Ben-Moshe | G06T 7/73 |

(Continued)

*Primary Examiner* — Kodzovi Acolatse
(74) *Attorney, Agent, or Firm* — Bryan W. Bockhop; Bockhop Intellectual Property Law, LLC

(57) ABSTRACT

In a method for routing communications through a constellation (100) of a plurality of CubeSats orbiting a planet and responsive to a ground controller, the ground controller determines optimal tunnels (210) that include inter-satellite links (122) between CubeSats by: generating virtual nodes (110); generating the sub-satellite points (120) to correspond to points on a path through each virtual node that CubeSats follow; calculating an inter-satellite link from a sub-satellite point another sub-satellite point during a period from a time of initialization when the first sub-satellite point is at an entry point of the first virtual node until the first sub-satellite point is at an exit point; and generating an information packet describing the optimal tunnel (210) including inter-satellite links (122) that interconnect the sub-satellite points (120). The information packet transmitted from the ground controller to one of the CubeSats and is forwarded from one of the CubeSats to remaining CubeSats.

12 Claims, 4 Drawing Sheets

(56) References Cited

U.S. PATENT DOCUMENTS

2020/0259739 A1* 8/2020 Kantawala ............ H04W 40/26
2022/0247678 A1* 8/2022 Atwal ................ H04B 7/18519

* cited by examiner

LOW-OVERHEAD ONLINE ROUTING SCHEME FOR ULTRA-DENSE SOFTWARE-DEFINED CUBESAT NETWORKS

CROSS-REFERENCE TO RELATED APPLICATION(S)

This application claims the benefit of U.S. Provisional Patent Application Ser. No. 63/091,712, filed Oct. 14, 2020, the entirety of which is hereby incorporated herein by reference.

BACKGROUND OF THE INVENTION

1. Field of the Invention

The present invention relates to satellite communications and, more specifically, to communications in a constellation of CubeSats.

2. Description of the Related Art

CubeSats (cube satellites) have increased in traction in the domains of aerospace systems, communications and networking. These miniaturized satellites are characterized by a cubic structure with sizes denoted as 1U, 2U, and so on, where "1U" refers to a $10 \times 10 \times 10^3$ cm cube. The rising popularity of these small satellites has led to the possibility of large-scale CubeSat constellations serving a wide variety of applications ranging from monitoring and reconnaissance to in-space backhauling. Such constellations will make robust data routing framework necessary. (A discussion of CubeSat constellations is disclosed in Patent Application Serial No. PCT/US19/66523 published as Publication No. WO 2020/124076, which is incorporated herein by reference.)

There are few routing algorithms that are geared towards CubeSat networks. One such algorithm employs a time-expanded graph-based scheme for networks that operate based on the bent-pipe paradigm and presents a variant of the contact graph routing approach for use with small satellites. On the other hand, there are several routing approaches employed with traditional low earth orbit (LEO) satellites. However, such schemes require distributed on-board path computation, precluding their use on CubeSats due their size limitations and computational limitations.

Another approach employs software-defined networking (SDN) for CubeSats. Because CubeSat constellations are considered to be long fat networks (LFN), software-defined CubeSat networks are adversely affected by the proliferation of control traffic produced by signaling messages that are exchanged between the controllers on the ground and the CubeSats in space. Therefore, any proposed SDN-based routing framework must address this issue.

The multipath TCP transport protocol, along with an accompanying routing framework, has been proposed general domain of SDN-based LEO satellite networks. However, this framework requires the use of GEO satellites, precluding its use in a CubeSat-only network. One SDN-based routing solution leverages ant colony optimization scheme over a set of discretized time intervals. Nonetheless, the path computation algorithm employed relies on prior knowledge of the traffic matrix during each discretized time slice, rendering it suboptimal for scenarios wherein flow requests arrive in an online manner. One of the more comprehensive works in this domain, SERvICE, presents a routing framework based on Delay Tolerant Networking and OpenFlow. However, SERvICE uses LEO satellites as access nodes only, instead relying on MEO satellites for data routing.

Several drawbacks tend to be common with existing systems, including: (i) emphasis on distributed on-board path computation; (ii) reliance on GEO and MEO satellites, and (iii) lack of consideration for control traffic volumes.

Therefore, there is a need for an online intra-domain segment routing framework for software-defined CubeSat networks.

SUMMARY OF THE INVENTION

The disadvantages of the prior art are overcome by the present invention which, in one aspect, is a method for routing communications through a constellation of a plurality of CubeSats orbiting a planet and responsive to a ground controller, in which the ground controller determines at least one optimal tunnel that includes a plurality of inter-satellite links between CubeSats in the plurality of CubeSats by executing the steps of: generating a virtual network topology by partitioning an orbital surface around the planet into a plurality of Voronoi tessellations and designating each of the Voronoi tessellations as a virtual node; generating the plurality of sub-satellite points so as to correspond to a plurality points on a path through each virtual node that CubeSats of the plurality of CubeSats follow as they transit through each virtual node; for at least a portion of the plurality of sub-satellite points, calculating an inter-satellite link from a first sub-satellite point in a first virtual node to a second sub-satellite point in a different second virtual node during a period for any point of time from a time of initialization when the first sub-satellite point is at an entry point of the first virtual node until the first sub-satellite point is at an exit point of the first virtual node; and generating an information packet describing the optimal tunnel that includes a plurality of inter-satellite links that interconnect a portion of the plurality of sub-satellite points during the period. The information packet transmitted from the ground controller to a selected one of the CubeSats. The information packet is forwarded from the selected one of the CubeSats to remaining ones of the CubeSats corresponding to sub-satellite points included in the tunnel.

In another aspect, the invention is a system for routing communications through a constellation of a plurality of CubeSats orbiting a planet that includes a ground controller. At least a portion of the plurality of CubeSats is responsive to the ground controller. The ground controller is configured to determine at least one optimal tunnel that includes a plurality of inter-satellite links between CubeSats in the plurality of CubeSats by executing the steps of: generate a virtual network topology by partitioning an orbital surface around the planet into a plurality of Voronoi tessellations and designate each of the Voronoi tessellations as a virtual node; generate the plurality of sub-satellite points so as to correspond to a plurality points on a path through each virtual node that CubeSats of the plurality of CubeSats follow as they transit through each virtual node; for at least a portion of the plurality of sub-satellite points, calculate an inter-satellite link from a first sub-satellite point in a first virtual node to a second sub-satellite point in a different second virtual node during a period for any point of time from a time of initialization when the first sub-satellite point is at an entry point of the first virtual node until the first sub-satellite point is at an exit point of the first virtual node; and generate an information packet describing the optimal tunnel that includes a plurality of inter-satellite links that interconnect a portion of the plurality of sub-satellite points during the period. The ground controller further configured to transmit the information packet from the ground controller to a selected one of the CubeSats. A selected one of the CubeSats is configured to forward the information packet to remaining ones of the CubeSats corresponding to sub-satellite points included in the tunnel.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
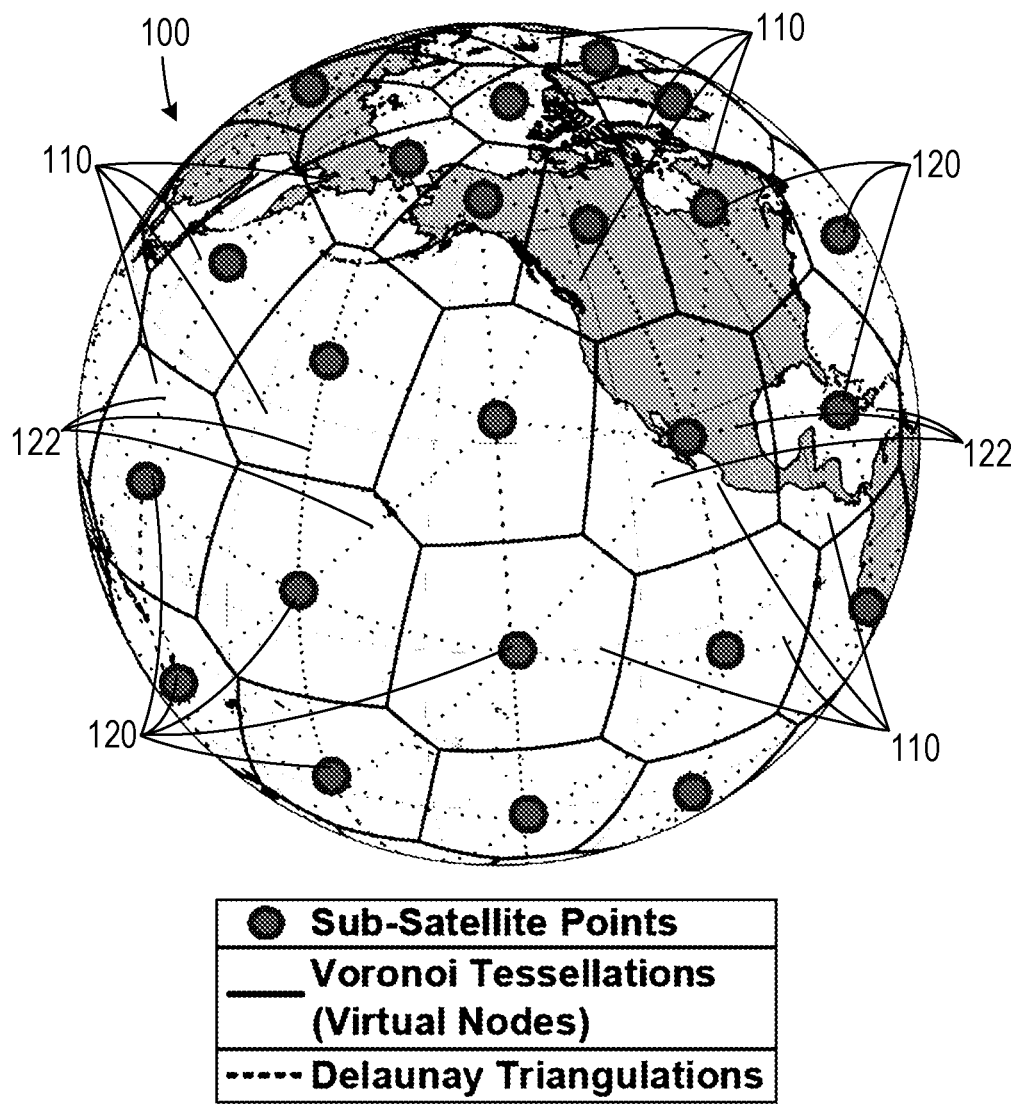
FIG. 1 is a schematic diagram showing Voronoi tessellation-based virtual nodes plotted on a globe.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The present routing scheme makes use of segment routing (SR) because it has been designed to significantly reduce control traffic and thus lends itself well to LFNs.

System model. Presented herein are details regarding the construction of an equivalent network topology from a given CubeSat constellation, along with the SR model used in the proposed framework. In particular, concerning the former, the system employs obtain key metrics associated with the network topology, such as orbital positions and link metrics. Further, the focus is on data routing within the domain of a single controller, i.e., state consistency considerations associated with multi-controller systems are beyond the scope of this study.

Topology Construction: The orbital motion of CubeSats causes rapid changes in network topology, with the resulting topological dynamism serving as a major impediment to efficient protocol design. To address this issue, the virtual topology (VT) and virtual node (VN) methods that serve to abstract these frequent topological changes are employed. Generally, the VT approach may not be amenable to SDN-based LFNs because of the amount of control traffic it generates. Instead, the present invention leverages the VN approach that divides the Earth's (or other planet's) surface into cells called VNs, and assigns a CubeSat for each VN, which is responsible for forwarding data associated with that VN.

As the CubeSat moves in its orbit, it may leave its initial VN and move into another cell, while a second CubeSat moves into the VN initially assigned to the first CubeSat. In this manner, the VNs remain static, while the actual CubeSat that is associated with a particular VN keeps changing. Path computation is then performed based on these static ground-reference VNs, as opposed to the CubeSats themselves. The primary advantage of this approach is that the controller needs to perform path computation only once per flow and then deliver the updates to the corresponding CubeSats that move in a deterministic manner across VNs. Packet loss that may occur during VN transitions can be handled through retransmissions at the transport layer, or via a dedicated handover scheme.

As shown in FIG. 1, within the context of the framework, the present invention generates VNs 110 through Voronoi tessellations that use the sub-satellite points (SSPs) 120 of the CubeSats in a constellation 100 as generators at the time of initialization, ti. The actual forwarding action at any given point in time, t+t$_i$, for a particular VN, is done by the CubeSat whose SSP lies closest to the generator point for that VN. While the VNs represent the nodes in the topology, denoted by the set V, connectivity between VNs is realized through inter-satellite links (ISLs) 122 that represent the edges, E.

Edge construction is performed at the time of initialization, the ISLs may experience path stretch and path contraction as time passes, in addition to outages. While the former is generally not a major concern, the latter can adversely impact system performance. To this end, with a view to maintaining low complexity, mean orthodromic distances between CubeSats are used as a measure of link length, along with the probability of ISL availability as a measure of link reliability. Within this context, a link is considered absent if its instantaneous link length exceeds a predefined maximum feasible ISL distance, $d_{ISL}$. With a view to maintaining high link availability, the framework selects only those ISLs for which the link reliability metric is above a predefined threshold $r_{TH}$.

The mean link distance and reliability computations are done on a per-orbital period basis at 0.01 second intervals, with the topology being reinitialized at the start of each orbital period. In this manner, the framework is also able to account for orbital effects such as nodal precession. Further, as a consequence of orbital motion, ISLs are intermittent as opposed to persistent. Therefore, the framework employs a link persistence metric, $p1 \forall l \in E$, which denotes the duration of the maximum continuous link outage over a single orbital period. As will be discussed in more detail below, the normalized link persistence metric, $$\overline{p}_l = \frac{p_l}{\max_{l \in E}\{p_l\}}$$

serves as a vital component of the link weight.

In general, edge construction considers the following: (i) any ISL is considered valid so long as it does not exceed $d_{ISL}$, and has a link reliability metric above the threshold, $r_{TH}$; (ii) inter-plane ISLs are switched off in the polar regions, i.e., the latitudes ranging from $\varphi=\pm 70°$ to $\varphi=\pm 90°$;

and (iii) ISLs cannot be established between counter-rotating CubeSats. Thus, through the VN and edge construction procedures, the framework transforms the CubeSat constellation into an equivalent undirected graph of the form G=(V, E), where V is the set of VNs, and E is the set of edges.

Segment Routing Model: SR is a good fit for software-defined CubeSat networks due to its emphasis on the minimization of control traffic. More specifically, the invention utilizes the middlepoint routing (MR) model in this framework, wherein routing is done based on a sequence of logical segments formed by middlepoints between the ingress and egress nodes. The following key terms from the MR model that are applicable to this framework:

Middlepoints: Middlepoints are those VNs through which a flow must necessarily pass. A flow may pass through one or more middlepoints on its way from the ingress to the egress node.

Segments: Segments are logical connections between: (i) two middlepoints, (ii) the ingress node and a middlepoint, or (iii) a middlepoint and the egress node. Each segment is realized as a single physical path that traverses a number of links between its two endpoints.

Tunnels: A tunnel can be visualized a sequence of segments that begins at the ingress, traverses a number of middlepoints, before ending at the egress node.

Figure 2:
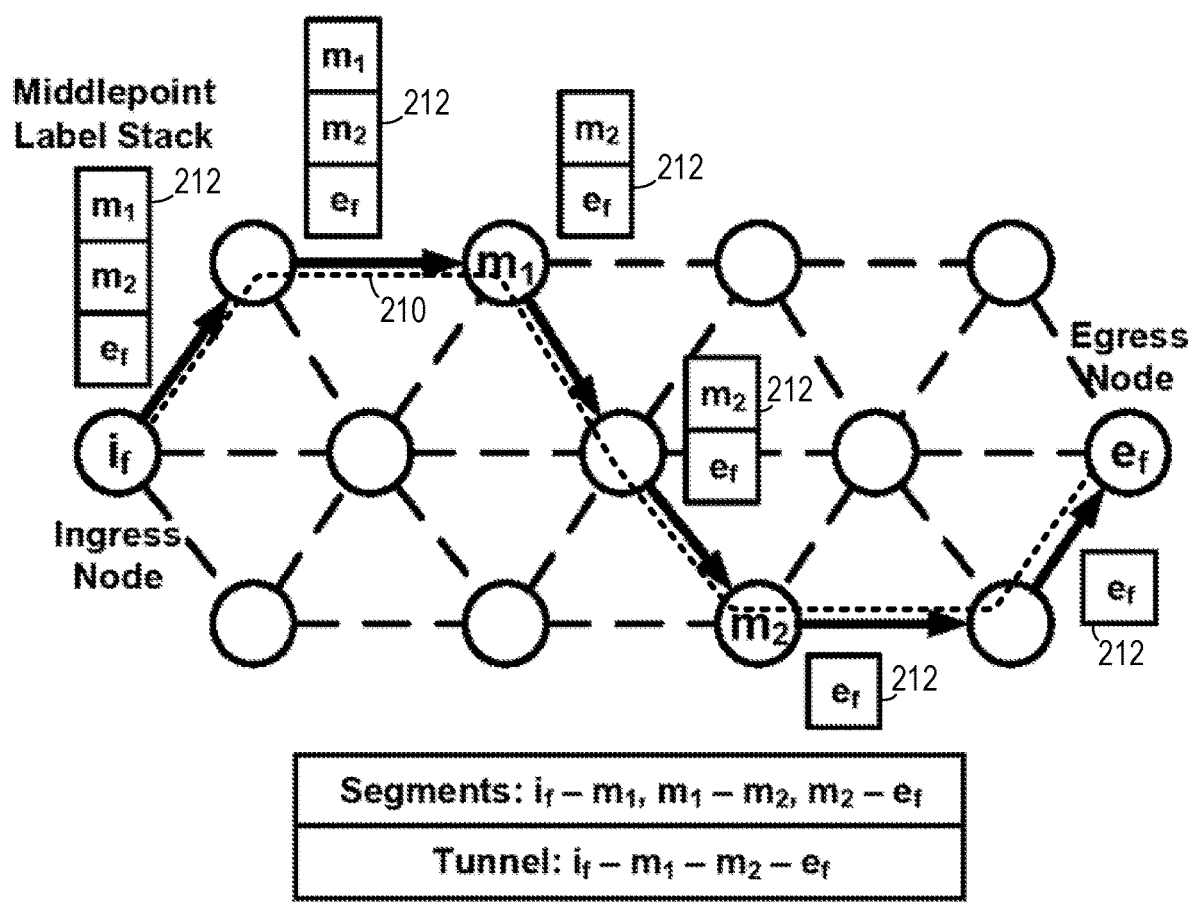
FIG. 2 is a schematic diagram showing a middlepoint-based segment routing model.

As shown in FIG. 2, the ground controller determines the optimal tunnel 210 or set of optimal tunnels for every flow within its domain. Information regarding the selected tunnel is included as part of the SR header, in the form of a stack of middlepoint labels 212. As the flow moves from one middlepoint to another, the top label is popped off, and the flow is routed to the middlepoint indicated by the next label. The bottom-most label in the stack identifies the egress node.

Thus, every VN along the tunnel need only store flow entries pertaining to the corresponding middlepoints and egress nodes. Since each flow is no longer identified by a unique source-destination pair, but instead by a collection of middlepoints, the intermediate nodes do not need to store flow entries for each demand, thereby achieving significant reduction in control traffic. It is also possible for the flow to be split across multiple tunnels between the ingress and egress nodes, thereby providing implicit support for multi-path routing and resiliency to CubeSat failure.

Problem formulation: Formulation of the problem involves defining an optimal intra-domain segment routing problem for CubeSat networks, along with our approach to the solution.

Problem Definition: Having obtained the undirected graph G=(V,E), the invention denotes the set of middlepoints by M, where $|M| \leq |V|$, i.e., every VN can serve as a candidate middlepoint. Further, every flow request $f \in F$ is characterized by an ingress node, $i_f$, an egress node, $e_f$, and a demand, $d_f$, which represents the bandwidth required by the flow. Further, $M_f$ denotes the number of middlepoints used for flow $f$ with $T_f$ representing the set of all possible tunnels with $M_f$ middlepoints, such that $M_f \leq |M|$. Every tunnel $t \in T_f$ is characterized by a set of segments, $S_t$, wherein each segment s is realized through a number of ISLs, $l \in E$. Each link, l, has a unit link-flow cost, $w_l$, and a link capacity, $c_l$. Since the intra-domain segment routing problem aims to determine the optimal set of tunnels to be used for a given flow request, the system employs the decision variable, $x_{ft} \forall f \in F$, $t \in T_f$, which characterizes the fraction of flow demand carried by tunnel t for flow $f$ such that, $$\sum_{t \in T_f} x_{ft} = 1 \ \forall f \in F, \quad (1)$$

and $x_{ft} \geq 0$. Also employed is an indicator variable, $\delta_{sl} \forall s \in S_t$, $l \in E$, of the form, $$\delta_{sl} = \begin{cases} 1, \text{ if segment } s \text{ uses link } l; \\ 0, \text{ otherwise}, \end{cases} \quad (2)$$

which characterizes the relationship between segments and links. Further e link capacity constraint is given as, $$g_l = \sum_{f \in F} \sum_{t \in T_f} \sum_{s \in S_t} \delta_{sl} x_{ft} d_f \leq c_l \ \forall l \in E. \quad (3)$$

The problem definition does not take CubeSat processing capacity constraints into consideration. The reason for this is two-fold: first, since the system leverages SDN, the processing overhead associated with on-board route computation is avoided, leaving flow table lookup as the only significant computational activity that is performed on the CubeSats; second, the incoming traffic at any given CubeSat cannot exceed the aggregate capacity of the ISLs associated with that CubeSat, making it trivial to provision appropriate processing capacity at all CubeSats during the network dimensioning stage.

In order to quantify the cost of routing over link l, the system takes into consideration both the normalized link persistence metric, $\overline{P}_l$, as well as the normalized link distance metric, $$\overline{o}_l = \frac{o_l}{d_{ISL}},$$

where $O_l$ is the mean orthodromic link length. Accordingly, the unit link flow cost is given by, $w_l = w_1 \overline{o}_l + w_2 \overline{p}_l$, where $w_1 + w_2 = 1$ and $0 \leq w_1, w_2 \leq 1$. Herein, the distance metric is representative of the transmission power required to transmit over said link, while the link persistence metric represents the data storage capacity required at the corresponding source CubeSat. This follows from the fact that links with a lower persistence metric will experience outages that last longer, thus requiring greater buffer capacity at the associated CubeSats. With this, the overall link cost, $y_l$, is expressed as, $$y_l = \sum_{f \in F} \sum_{t \in T_f} \sum_{s \in S_t} \delta_{sl} x_{ft} w_l \frac{d_f}{c_l} \ \forall l \in E. \quad (4)$$

Considering equation (4), the link cost is jointly characterized by the link length, persistence, and capacity. Together, these three parameters serve as the joint routing metric. The corresponding utility function is then given by, $$U_{SR} = \max_{l \in E} \{y_l : \forall l \in E\}, \quad (5)$$

with the associated optimization problem being given by:

Find: $x_{ft}$, $\forall f \in F$, $t \in T_f$
Minimize: $U_{SR}$ (6)
Subject To: (1) and (3)

The problem presented above seeks to assign a set of tunnels to each flow request, with a view to minimize the maximum link cost, with the objective function serving two purposes: (i) load balancing, and (ii) cost minimization. The latter is necessitated by the fact that: (i) CubeSats have a limited power budget, and transmitting over unnecessarily long distances leads to energy wastage, and (ii) CubeSats have limited data storage capabilities, and therefore links with low persistence are best avoided.

Pre-processing Procedures: At the outset, from (6) we note that the size of the problem is significantly impacted by $|M|$, $|T_f|$, and $M_f$. For example, with $M_f = |M| = |V|$, the number of candidate tunnels per flow request, $f$, would be $\Sigma_{i=1}^{i=|V|} \binom{|V|}{i} i!$, i.e., for a network of 500 CubeSats, that amounts to a nearly infinite number of decision variables per flow. Therefore, before attempting to develop an algorithm, it is necessary to undertake certain preprocessing procedures to make the problem more tractable.

First, in order to select the elements of set M, the system leverages the concept of betweenness centrality. In general, the betweeness centrality, for any $VN v \in V$, is given by $$C_B(v) = \sum_{\substack{s \in V \\ s \neq v}} \sum_{\substack{t \in V \\ t \neq s \neq v}} \frac{\sigma_{st}(v)}{\sigma_{st}} \quad \forall v \in V, \quad (7)$$

where $\sigma_{st}(v)$ is the number of shortest paths from s and t that pass through v and $\sigma_{st}$ is the total number of shortest paths from s to t. Path length is measured with respect to the unit link-flow cost, $w_l$. Generally, segment routing operates well even with a relatively few number of middlepoints, therefore, after computing the betweeness centrality for each VN, the system picks the top NM VNs as middlepoints, such that $|M| = NM$.

Next, the system quantifies the number of middlepoints per flow, Mf, using a simple distance-dependent metric of the form $$M_f = \min\left\{\max\left\{\left\lceil \frac{\text{distance}(i_f, e_f)}{d_{ISL}} \right\rceil, 1\right\}, |M|\right\} \quad \forall f \in F. \quad (8)$$

The motivation being that, since the link length cannot exceed $d_{ISL}$, $M_f$ provides a measure of the minimum number of VNs that a flow must be routed through, fitting well with the definition of middlepoints. Further, since the framework deals exclusively with intra-domain routing, the number of middlepoints as obtained from (8), and consequently, the number of candidate tunnels, $|T_f|$ is not very large. Additionally, for any segment, s, between two middlepoints, the corresponding physical links that comprise this segment can be determined by calculating the shortest path, with respect to $w_l$, between the two middlepoints, thus determining $\delta_{sl}$. Finally, the pre-processing procedures described herein can be performed efficiently in an offline manner, before running the route optimization framework described next.

Online Optimization Framework: The optimization problem presented in (6) can be trivially linearized, and solved using a linear programming solver such as CPLEX. However, an offline solution of this kind requires a traffic matrix that describes the flow sources, destinations, and demands, in advance. In a practical scenario, however, flow requests arrive sequentially over time, and the system may not have information concerning the parameters associated with future requests, thus, requiring an online optimization framework.

The analysis begins by restating the constraints in (1) and (3) for a scenario where the first i-1 requests have been routed, as follows, $$\sum_{t \in T_f} x_{ft} = 1 \quad \forall f \in \{1, 2, \ldots, i-1\}, \quad (9)$$

with $x_{ft} \geq 0$, and $$g_l(i-1) = \sum_{f=1}^{i-1} \sum_{t \in T_f} \sum_{s \in S_t} \delta_{sl} x_{ft} d_f \leq c_l \quad \forall l \in E. \quad (10)$$

Further, the link cost including the $(i-1)^{th}$ request is given by, $$y_l(i-1) = \sum_{f=1}^{i-1} \sum_{t \in T_f} \sum_{s \in S_t} \delta_{sl} x_{ft} w_l \frac{d_f}{c_l} \quad \forall l \in E. \quad (11)$$

For routing the $i^{th}$ request through tunnel $t \in T_i$, we introduce a modified utility function of the form, $$U_{OL}(i, t) = \sum_{s \in S_t} \sum_{l \in E} \delta_{sl} \left( \kappa^{\overline{y}_l(i-1) + \frac{w_l d_i}{c_l \Lambda}} - \kappa^{\overline{y}_l(i-1)} \right), \quad (12)$$

where $\kappa > 1$ and, $$\overline{y}_l(\cdot) = \frac{y_l(\cdot)}{\Lambda},$$

with $\Lambda$ being an estimate of the optimal cost defined in (6). More specifically, (12) represents the change in the sum exponential costs given the previous i-1 requests, as a result of routing the $i^{th}$ request through tunnel t. Minimizing $U_{OL}(i)$ works well in practice because: (i) it ensures that no single link exhibits too high a cost either as a result of link weight or traffic volume; and (ii) the use of exponential costs prevents resource wastage, ensuring that a larger number of requests can be served.

Taking into consideration (9), (10), and (12), Algorithm 1, below, outlines the tunnel selection subroutine for the $i^{th}$ request. More specifically, the algorithm takes as input, an estimate of the optimal cost, $\Lambda$, the performance guarantee, $\beta$, the graph, G, the flow request, i, the existing costs, $y_l(i-1)$, the candidate tunnels, $T_i$, along with the segments and links comprising each tunnel, and attempts to find the set of minimum cost tunnels, $X_i$, with respect to (12). The validity of each tunnel is checked by verifying whether: (i) $y_l(i) > \beta \Lambda$, and (ii) $\Sigma_{f=1}^{i} \Sigma_{t \in T_f} \Sigma_{s \in S_t} \delta_{sl} X_{ft} d_f \leq c_l$, for all links that are a part of the tunnel. If a minimum cost tunnel fails to meet either criteria, it is discarded, and if all tunnels fail to meet either criteria, the request i is rejected. Concerning the performance of the algorithm, we introduce Theorem 1.

Within the context of the presented theorem, $\lambda^*$ represents the optimal offline cost defined in (6).

| Algorithm 1 Tunnel Selection Subroutine | |
|---|---|
| 1: Input: $\Lambda$, $\beta$, G, $i_i$, $e_i$, $d_i$, $y_l(i-1)$, $T_i$ | |
| 2: Output: $X_i$ | |
| 3: $X_i \leftarrow \emptyset$ | |
| 4: for $t \leftarrow 1$ to $|T_i|$ do | |
| 5:   if $U_{OL}(i, t) = \min_{t \in T_i}\{U_{OL}(i, t)\}$ then | |
| 6:     $X_i \leftarrow X_i \cup \{t\}$ | |
| 7:   end if | |
| 8: end for | |
| 9: $t \leftarrow 0$ | |
| 10: while $t < |X_i|$ do | |
| 11:   if $\exists\, l \in t : y_l(i-1) + \dfrac{w_l d_i}{c_l |X_i|} > \beta\Lambda$ or $g_l(i-1) + \dfrac{d_i}{|X_i|} > c_l$ | |
| 12:     $X_i \leftarrow X_i \setminus \{t\}$ | |
| 13:     if $X_i = \emptyset$ then | |
| 14:       break | |
| 15:     else | |
| 16:       $t \leftarrow 0$ | |
| 17:       continue | |
| 18:     end if | |
| 19:   end if | |
| 20:   $t \leftarrow t + 1$ | |
| 21: end while | |
| 22: If $X_i = \emptyset$ then | |
| 23:   return FAIL | |
| 24: else | |
| 25:   return $X_i$ | |
| 26: end if | |

Theorem 1: If there exists a $\lambda^*$: $\lambda^* \leq \Lambda$, then Algorithm 1 will always find a set of tunnels to route the incoming flow request through, with a corresponding performance guarantee $\beta$, i.e., $y_l(i) \leq \beta\Lambda \forall l \in E$, provided none of the selected tunnels violate the link capacity constraint.

Proof: Begin by introducing $X_i^*$ which denotes the optimal offline tunnel set for the $i^{th}$ flow request, along with $$\overline{y}_l^*(i) = \frac{y_l^*(i)}{\Lambda},$$

which denotes the normalized cost after routing i requests under the optimal offline solution. Further, the incremental cost associated with routing the $i^{th}$ request over link l is defined as $$z_l(i) = \frac{w_l d_i}{c_l},$$

with $$\overline{z}_l(i) = \frac{z_l(i)}{\Lambda}.$$

Then, the following potential function is introduced where $\gamma > 1$. For the $i_{th}$ request, the change in the potential function is given by, $$\Phi(i) = \sum_{l \in E} \kappa^{\overline{y}_l(i)}(\gamma - \overline{y}_l^*(i)), \tag{13}$$

where $\gamma > 1$. For the $i_{th}$ request, the change in the potential function is given by, $$\Phi(i) - \Phi(i-1) = \tag{14}$$

$$\sum_{l \in E} \kappa^{\overline{y}_l(i)}(\gamma - (\overline{y}_l^*(i-1) + \overline{z}_l(i))) - \sum_{l \in E} \kappa^{\overline{y}_l(i-1)}(\gamma - \overline{y}_l^*(i-1)) =$$

$$\sum_{l \in X_i} \left(\kappa^{\overline{y}_l(i)} - \kappa^{\overline{y}_l(i-1)}\right)(\gamma - \overline{y}_l^*(i-1)) - \sum_{l \in X_i^*} \kappa^{\overline{y}_l(i)}\overline{z}_l(i).$$

Since, $\overline{y}_l^*(i-1) \geq 0$, from (14), this can be expressed as $$\Phi(i) - \Phi(i-1) \leq \sum_{l \in X_i} \gamma\left(\kappa^{\overline{y}_l(i-1)+\overline{z}_l(i)} - \kappa^{\overline{y}_l(i-1)}\right) - \sum_{l \in X_i^*} \kappa^{\overline{y}_l(i)}\overline{z}_l(i) \leq \tag{15}$$

$$\sum_{l \in X_i^*} \gamma\left(\kappa^{\overline{y}_l(i-1)+\overline{z}_l(i)} - \kappa^{\overline{y}_l(i-1)}\right) - \sum_{l \in X_i^*} \kappa^{\overline{y}_l(i)}\overline{z}_l(i) =$$

$$\sum_{l \in X_i^*} \kappa^{\overline{y}_l(i-1)}\left[\gamma\left(\kappa^{\overline{z}_l(i)} - 1\right) - \overline{z}_l(i)\right],$$

where the second inequality follows from the fact that $X_i$ represents the optimal set with respect to $K^{\overline{y}_l(i-1)+\overline{z}_l(i)} - K^{\overline{y}_l(i-1)}$, and replacing $X_i$ with $X_i^*$ leads to a higher overall cost.

Next, the potential function does not increase with each incoming request, i.e., $\Phi(i) - \Phi(i-1) \leq 0$. Since, $$\forall\, l \in X_i^*, 0 \leq \overline{z}_l(i) \leq \frac{\lambda^*}{\Lambda} \leq 1,$$

therefore, it needs only to be shown that $\gamma(k^{\overline{z}_l(i)} - 1) - \overline{z}_l(i) \leq 0$. This condition holds true when $$\kappa \leq 1 + \frac{1}{\gamma}.$$

Further, with $$\overline{y}_l^*(i) \leq \frac{\lambda^*}{\Lambda} \leq 1, \kappa > 1,$$

and $\Phi(i) \leq \Phi(i-1)$, routing the $i^{th}$ request gives rise to $$(\gamma - 1)\kappa^{\max_{i \in E} \overline{y}_l(i)} \leq (\gamma - 1)\sum_{l \in E} \kappa^{\overline{y}_l(i)} \leq \Phi(i) \leq \Phi(0), \tag{16}$$

where, $\Phi(0) \leq \gamma|E|$. The result in (16) can be restated as $\max_{l \in E} y_l(i) \leq \beta\Lambda$, where $$\beta = \log_\kappa\left(\frac{\gamma|E|}{\gamma - 1}\right). \tag{17}$$

Thus, Algorithm 1 can be leveraged for the framework. The fundamental idea can be summarized as follows. If Algorithm 1 returns FAIL, flow request i is rejected, and the estimated optimal cost, $\Lambda$, is doubled with all existing costs being set to 0, i.e., $y_l(i) \leftarrow 0$, in line with the doubling approach. The performance of the framework is given in terms of its competitive ratio in Proposition 1. The competitive ratio of an online algorithm is the worst-case ratio between the cost of the solution found by the algorithm to the cost of the optimal offline solution, which considers all flow requests at once, based on the availability of a traffic matrix.

Proposition 1. The competitive ratio of the proposed online optimization framework is of the form $O(\log|E|)$. Proof. On account of the doubling approach, $\wedge \leq 4\lambda^*$. Combining this result with Theorem 1 gives $\max_{i \in E} y_i(i) \leq 4\beta\lambda^*$. Thus, the competitive ratio is of the form $O(\log|E|)$.

In one experimental embodiment, performance evaluation was based on the following metrics: (i) demand satisfaction, (ii) control traffic volume, and (iii) average link utilization. The simulation results are obtained using the Starlink constellation that consists of 1584 satellites at an altitude of 550 km with an inclination of 53°.

Figure 3A:
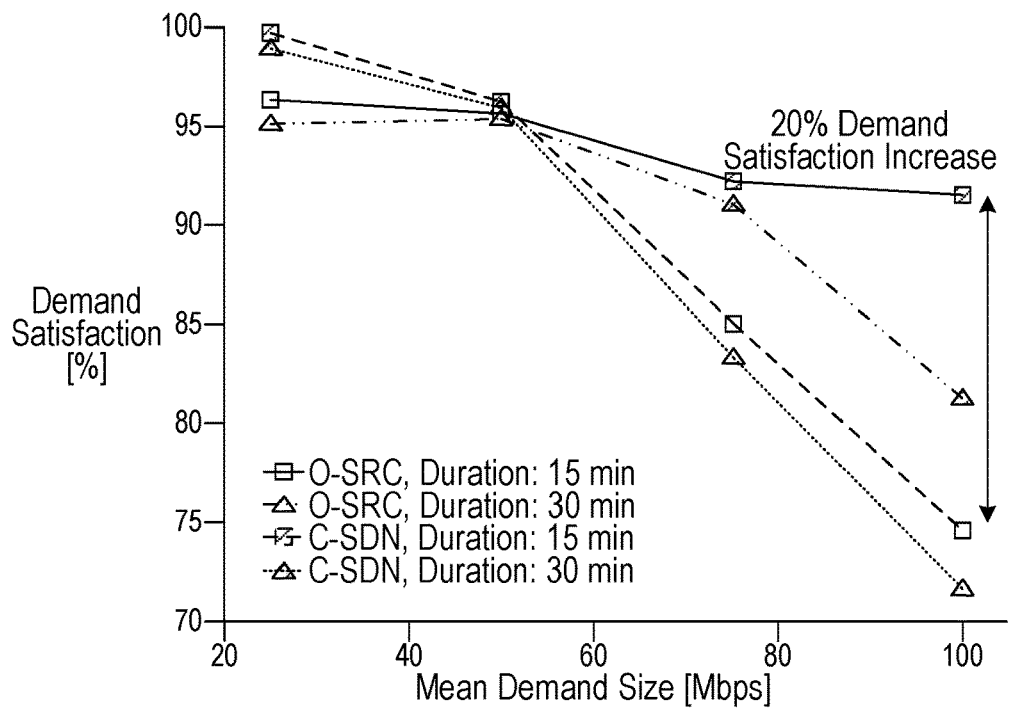
FIG. 3A is a performance evaluation metric chart showing demand satisfaction in relation to mean demand size.

In the experimental embodiment, 2000 flows were generated across 100 trials from a Poisson distribution with a mean rate of 1 arrival per minute, and random source destination pairings within the continental United States. The average values for all three metrics were plotted in FIGS. 3A-3C, using the acronym O-SRC to denote our framework, and C-SDN to denote classical SDN. The flow demands and duration values are generated from a uniform distribution and an exponential distribution respectively, while the ISL capacities (in Mbps) are obtained from a uniform distribution of the form U(50, 1000). The other parameters are set as follows: $d_{ISL}$=850 km, $r_{TH}$=0.7, $|N_M|$=8, and $\gamma$=2. As shown in FIG. 3a, the variation in demand satisfaction as the mean flow demand was varied from 25 Mbps to 100 Mbps, and the mean flow duration is varied from 15 minutes to 30 minutes. The demand satisfaction value represents the percentage of flows for which a suitable route can be found, i.e., the percentage of accepted requests. As shown in FIG. 3A, the demand satisfaction decreases as the mean demand and mean duration increase. This result follows from the fact that as flows consume more bandwidth and last longer, the network becomes saturated, increasing the flow rejection rate. However, even in the worst case scenario OSR is able to accept 20% more flows than the C-SDN system, highlighting the robustness of the system.

Figure 3B:
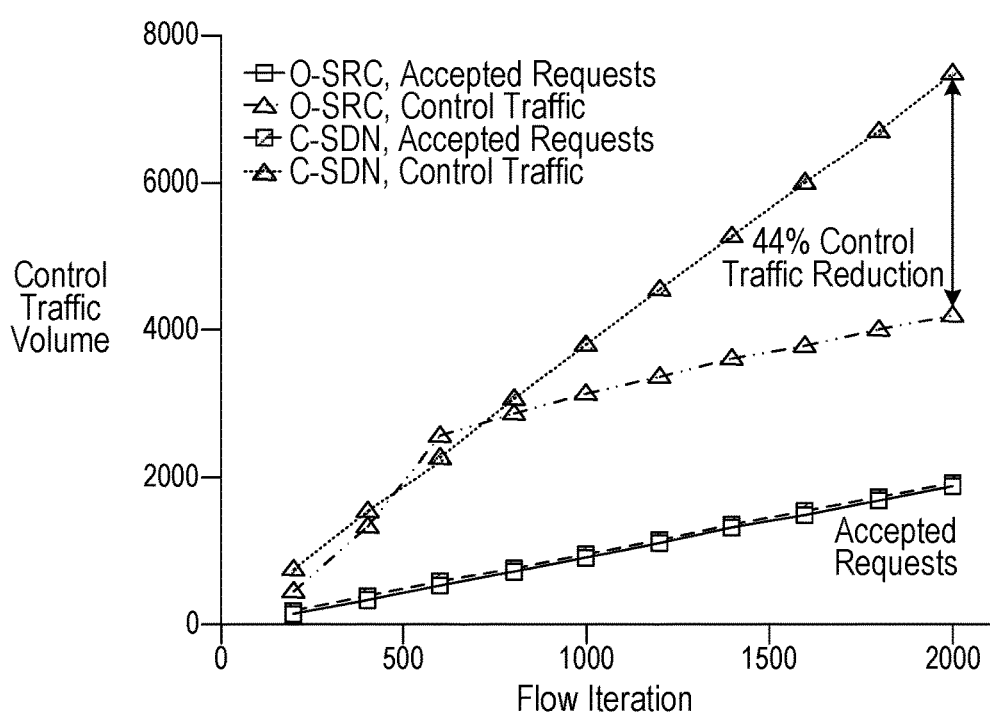
FIG. 3B is a performance evaluation metric chart showing control traffic volume in relation to flow iteration.

Next, as shown in FIG. 3B, the control traffic volumes across O-SRC and C-SDN during the time elapsed between the first and the last flow requests are compared. The control traffic volume represents the number of messages that are exchanged between the controller and the CubeSats in order to successfully route the incoming flows. The comparison shown in FIG. 3B is based on a mean demand of 50 Mbps and a mean duration of 30 minutes due to a similar level of request acceptance across segment routing and classical SDN. It is apparent that O-SRC achieves a significant reduction in control traffic, with a control traffic volume that is nearly half that of C-SDN.

Figure 3C:
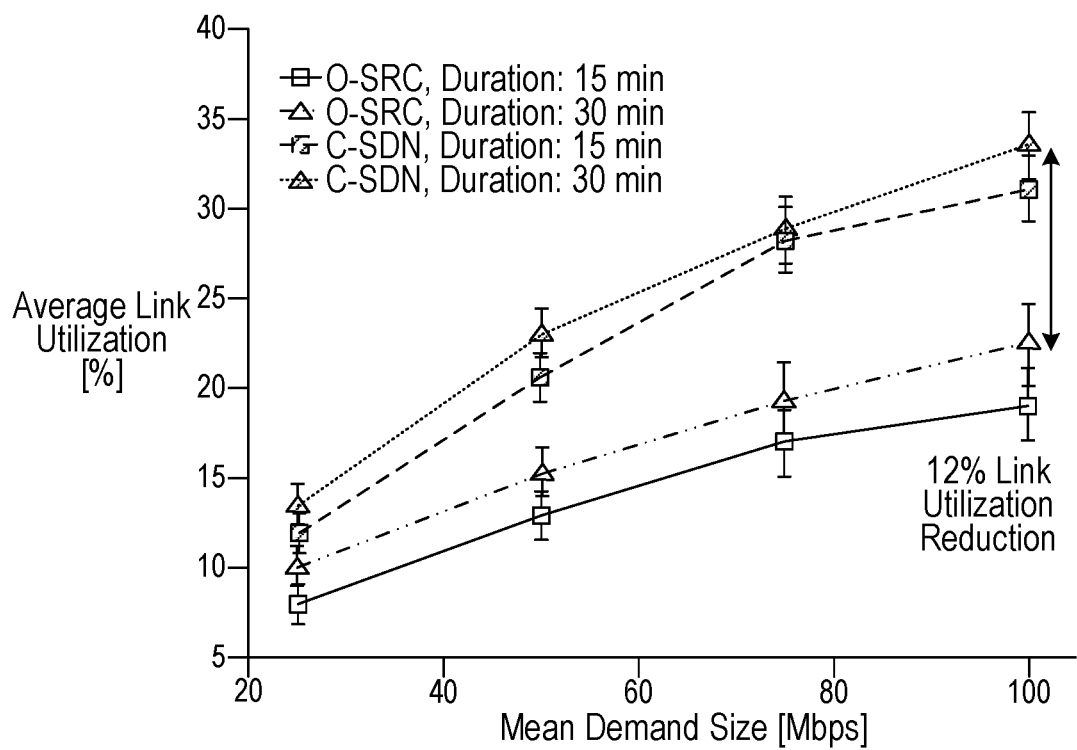
FIG. 3C is a performance evaluation metric chart showing average link utilization in relation to mean demand size.

As shown in FIG. 3C, the average link utilization with a 95% confidence interval for varying flow demands and durations is demonstrated. As expected, an increase in either the demand or the duration leads to an increase in the link utilization. However, O-SRC consistently achieves a lower link utilization than C-SDN, highlighting the load balancing capabilities of the framework. In particular, for a mean demand of 100 Mbps and a mean duration of 15 minutes, O-SRC achieves a 12% lower link utilization, while achieving a 20% higher demand satisfaction than C-SDN, i.e., the framework is able to route a larger number of flows while keeping the average link utilization low. Thus, the suitability of the proposed framework for resource constrained LFNs has been demonstrated. Based on the results obtained, not only does our framework achieve a higher level of demand satisfaction but also provides a significant reduction in control traffic, along with load balancing.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for routing communications through a constellation of a plurality of CubeSats orbiting a planet and responsive to a ground controller, comprising the steps of:
   (a) determining by the ground controller at least one optimal tunnel that includes a plurality of inter-satellite links between CubeSats in the plurality of CubeSats by executing the steps of:
      (i) generating a virtual network topology by partitioning an orbital surface around the planet into a plurality of Voronoi tessellations and designating each of the Voronoi tessellations as a virtual node;
      (ii) generating the plurality of sub-satellite points so as to correspond to a plurality points on a path through each virtual node that CubeSats of the plurality of CubeSats follow as they transit through each virtual node;
      (iii) for at least a portion of the plurality of sub-satellite points, calculating an inter-satellite link from a first sub-satellite point in a first virtual node to a second sub-satellite point in a different second virtual node during a period for any point of time from a time of initialization when the first sub-satellite point is at an entry point of the first virtual node until the first sub-satellite point is at an exit point of the first virtual node; and
      (iv) generating an information packet describing the optimal tunnel that includes a plurality of inter-satellite links that interconnect a portion of the plurality of sub-satellite points during the period;
   (b) transmitting the information packet from the ground controller to a selected one of the CubeSats; and (c) forwarding the information packet from the selected one of the CubeSats to remaining ones of the CubeSats corresponding to sub-satellite points included in the tunnel.

2. The method of claim 1, wherein each inter-satellite link has an associated distance and further comprising the step of calculating the distance on a per-orbital basis.

3. The method of claim 2, wherein the step of calculating the distance is repeated at 0.01 second intervals.

4. The method of claim 1, wherein each inter-satellite link has an associated reliability and further comprising the step of calculating the reliability on a per-orbital basis.

5. The method of claim 4, wherein the step of calculating the reliability is repeated at 0.01 second intervals.

6. The method of claim 1, wherein the tunnel is selected by executing the steps of:

```
1:  Input: Λ, β, G, i_i, e_i, d_i, y_l(i − 1), T_i
2:  Output: X_i
3:  X_i ← ∅
4:  for t ← 1 to |T_i| do
5:    if U_OL(i, t) = min_{τ∈T_i} {U_OL(i, t)}
      then
6:      X_i ← X_i ∪ {t}
7:    end if
8:  end for
9:  t ← 0
10: while t < |X_i| do
11:   if ∃ l ∈ t : y_l(i − 1) + (w_l d_i)/(c_l |X_i|)  or  g_l(i − 1) + d_i/|X_i| > c_l
      then
12:     X_i ← X_i \ {t}
13:     if X_i = ∅ then
14:       break
15:     else
16:       t ← 0
17:       continue
18:     end if
19:   end if
20:   t ← t + 1
21: end while
22: if X_i = ∅ then
23:   return FAIL
24: else
25:   return X_i
26: end if,
``` where: $\Lambda$ is an estimated optimal cost; $\beta$ is a performance guarantee; G is an undirected graph corresponding to the constellation that includes the plurality of virtual nodes and a set of edges; $i_i$ is an $i^{th}$ flow request; $e_i$ is an egress node; $d_i$ is a demand metric representing required bandwidth; $y_l$ is a normalized cost associated with a link; $T_i$ is a set of tunnels; $X_i$ is an optimal offline tunnel set; t is a tunnel; $U_{OL}(i, t)$ is a unity function; $w_l$ is a unit link flow cost; $d_i$ is a demand metric; and $g_i$ is a link capacity constraint.

7. A system for routing communications through a constellation of a plurality of CubeSats orbiting a planet, comprising:

(a) a ground controller to which at least a portion of the plurality of CubeSats is responsive, the ground controller configured to determine at least one optimal tunnel that includes a plurality of inter-satellite links between CubeSats in the plurality of CubeSats by executing the steps of:

(i) generate a virtual network topology by partitioning an orbital surface around the planet into a plurality of Voronoi tessellations and designate each of the Voronoi tessellations as a virtual node;

(ii) generate the plurality of sub-satellite points so as to correspond to a plurality points on a path through each virtual node that CubeSats of the plurality of CubeSats follow as they transit through each virtual node;

(iii) for at least a portion of the plurality of sub-satellite points, calculate an inter-satellite link from a first sub-satellite point in a first virtual node to a second sub-satellite point in a different second virtual node during a period for any point of time from a time of initialization when the first sub-satellite point is at an entry point of the first virtual node until the first sub-satellite point is at an exit point of the first virtual node; and (iv) generate an information packet describing the optimal tunnel that includes a plurality of inter-satellite links that interconnect a portion of the plurality of sub-satellite points during the period; and (b) the ground controller further configured to transmit the information packet from the ground controller to a selected one of the CubeSats, wherein a selected one of the CubeSats is configured to forward the information packet to remaining ones of the CubeSats corresponding to sub-satellite points included in the tunnel.

8. The system of claim 7, wherein each inter-satellite link has an associated distance and further comprising the step of calculating the distance on a per-orbital basis.

9. The system of claim 8, wherein the step of calculating the distance is repeated at 0.01 second intervals.

10. The system of claim 7, wherein each inter-satellite link has an associated reliability and further comprising the step of calculating the reliability on a per-orbital basis.

11. The system of claim 10, wherein the step of calculating the reliability is repeated at 0.01 second intervals.

12. The system of claim 7, wherein the tunnel is selected by executing the steps of:

```
1:  Input: Λ, B, G, i_i, e_i, d_i, y_l(i − 1), T_i
2:  Output: X_i
3:  X_i ← ∅
4:  for t ← 1 to |T_i| do
5:    if U_OL(i, t) = min_{τ∈T_i} {U_OL(i, t)}
      then
6:      X_i ← X_i ∪ {t}
7:    end if
8:  end for
9:  t ← 0
10: while t < |X_i| do
11:   if ∃ l ∈ t : y_l(i − 1) + (w_l d_i)/(c_l |X_i|)  or  g_l(i − 1) + d_i/|X_i| > c_l
12:     X_i ← X_i \ {t}
13:     if X_i = ∅ then
14:       break
15:     else
16:       t ← 0
17:       continue
18:     end if
19:   end if
```

```
20:     t ← t + 1
21: end while
22: if X_i = ∅ then
23:     return FAIL
24: else
25:     return X_i
26: end if,
``` where: $\wedge$ is an estimated optimal cost; $\beta$ is a performance guarantee; G is an undirected graph corresponding to the constellation that includes the plurality of virtual nodes and a set of edges; $i_j$, is an $i^{th}$ flow request; $e_i$ is an egress node; $d_i$ is a demand metric representing required bandwidth; $y_l$ is a normalized cost associated with a link; $T_i$ is a set of tunnels; $X_i$ is an optimal offline tunnel set; t is a tunnel;

$U_{OL}(i, t)$ is a unity function; $w_l$ is a unit link flow cost; $d_i$ is a demand metric; and $g_l$ is a link capacity constraint.

\* \* \* \* \*